US011410509B1

(12) United States Patent
Lecocke et al.

(10) Patent No.: US 11,410,509 B1
(45) Date of Patent: Aug. 9, 2022

(54) DISASTER RESPONSE MANAGEMENT SYSTEM

(71) Applicant: UIPCO, LLC, San Antonio, TX (US)

(72) Inventors: Meredith Beveridge Lecocke, San Antonio, TX (US); Michael J. Maciolek, Boerne, TX (US); Robert Wiseman Simpson, Fair Oaks Ranch, TX (US); Daniel Christopher Bitsis, Jr., San Antonio, TX (US); Bobby Lawrence Mohs, San Antonio, TX (US); Manfred Amann, San Antonio, TX (US); Emily Margaret Gray, San Antonio, TX (US); Donnette Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/528,528

(22) Filed: Jul. 31, 2019

Related U.S. Application Data

(60) Provisional application No. 62/773,726, filed on Nov. 30, 2018.

(51) Int. Cl.
| | | |
|---|---|---|
| *G08B 7/06* | (2006.01) |
| *G06Q 50/26* | (2012.01) |
| *G06Q 10/06* | (2012.01) |
| *H04W 4/029* | (2018.01) |

(52) U.S. Cl.
CPC ............ *G08B 7/06* (2013.01); *G06Q 10/0637* (2013.01); *G06Q 10/06315* (2013.01); *G06Q 50/265* (2013.01); *H04W 4/029* (2018.02)

(58) Field of Classification Search
CPC ...... G08B 7/06; G08B 25/016; G08B 25/006; H04W 4/029; H04W 76/007; H04W 4/22; G06Q 10/06315; G06Q 10/0637; G06Q 50/265
USPC .......................................................... 340/326
See application file for complete search history.

(56) References Cited

U.S. PATENT DOCUMENTS

| | | | |
|---|---|---|---|
| 2011/0071880 A1* | 3/2011 | Spector | H04W 4/90 340/573.1 |
| 2012/0136923 A1* | 5/2012 | Grube | H04W 4/021 709/203 |
| 2012/0218102 A1* | 8/2012 | Bivens | G08B 25/009 340/539.13 |
| 2016/0148490 A1* | 5/2016 | Barnes | H04M 1/72536 455/404.1 |
| 2017/0186057 A1* | 6/2017 | Metnick | G06Q 20/382 |
| 2018/0365785 A1* | 12/2018 | Boss | G06Q 10/063112 |
| 2020/0387941 A1* | 12/2020 | Gassel | G06Q 20/1085 |

* cited by examiner

*Primary Examiner* — Kam Wan Ma
(74) *Attorney, Agent, or Firm* — Plumsea Law group, LLC

(57) ABSTRACT

A disaster response management system may include a device processor; and a non-transitory computer readable medium including instructions executable by the device processor to perform the following steps: receiving location data from a personal electronic device of a user; sending instructions for selectively displaying, based on the received location data, a list of one or more disaster response items which the user may commit to provide; and receiving a selection of the user committing to provide one of the selectively displayed disaster response items.

17 Claims, 11 Drawing Sheets

DISASTER RESPONSE MANAGEMENT SYSTEM

CROSS-REFERENCE TO RELATED APPLICATIONS

This application claims priority to U.S. Provisional Patent Application No. 62/773,726, filed Nov. 30, 2018, the entire disclosure of which is hereby incorporated by reference.

TECHNICAL FIELD

The present disclosure generally relates to disaster response management systems and, more particularly, to systems for coordinating disaster response efforts by volunteers and first responders.

BACKGROUND

The scope of disaster response efforts can be significantly increased with the assistance of volunteers. Additionally, first responders of various first responder organizations can find it difficult to coordinate their collective efforts when many first responder organizations are summoned simultaneously, particularly when the extent of a disaster tests the collective capacity of the first responder organizations.

There is a need in the art for a system and method that addresses the shortcomings discussed above. In particular, there is a need in the art for a disaster condition monitoring system.

SUMMARY

The disclosed disaster response management systems may include several features for coordinating disaster response provided by volunteers and first responders, Volunteers may, using an Internet website or an application for a personal electronic device, sign up to provide one or more disaster responses by selecting from a list of disaster response items (e.g., services, equipment, vehicles, etc.) needed in the user's area. The list of disaster response items needed in a given area may be generated based on location data regarding the geographic location of the user's personal electronic device.

In some embodiments, the volunteers may list the items for which they are willing to contribute to the disaster response effort. In such cases, the system may be configured to facilitate sending a proposal (e.g., from a disaster response organization) to the user for a disaster response item that is consistent with the types of items for which they have volunteered their commitment. For example, if the user indicates that they are willing to contribute supply distribution services, a disaster response organization may send the user a proposal, through the system, for a task distributing water in the wake of a hurricane in proximity to the user. The user may accept the proposal.

In some embodiments, first responders may utilize a disaster response management system to coordinate and multiply disaster response efforts. For example, first responder organizations may utilize the system to post a need for assistance related to disaster situations, Other first responders (e.g., from neighboring towns, or individuals visiting from out of town) may utilize the system to sign up to offer their assistance to first responder efforts.

In one aspect, the present disclosure is directed to a disaster response management system. The system may include a device processor; and a non-transitory computer readable medium including instructions executable by the device processor to perform the following steps: receiving location data from a personal electronic device of a user; sending instructions for selectively displaying, based on the received location data, a list of one or more disaster response items which the user may commit to provide; and receiving a selection of the user committing to provide one of the selectively displayed disaster response items.

In another aspect, the present disclosure is directed to a disaster response management system, comprising: a device processor; and a non-transitory computer readable medium including instructions executable by the device processor to perform the following steps: receiving, from a first responder organization, a list of one or more disaster response services needed by the first responder organization; receiving location data from a personal electronic device of a user; receiving an indication from a user that the user has training in first responder services; and sending instructions for selectively displaying, based on the received location data, a list of one or more first responder services which the user may commit to provide.

In another aspect, the present disclosure is directed to a disaster response management method. The method may include receiving, with a controller having a device processor and a non-transitory computer readable medium including instructions executable by the device processor, location data from a personal electronic device of a user; sending, to the personal electronic device of the user, instructions for selectively displaying, based on the received location data, a list of one or more disaster response items which the user may commit to provide; and receiving, with the controller, a selection of the user committing to provide one of the selectively displayed disaster response items.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
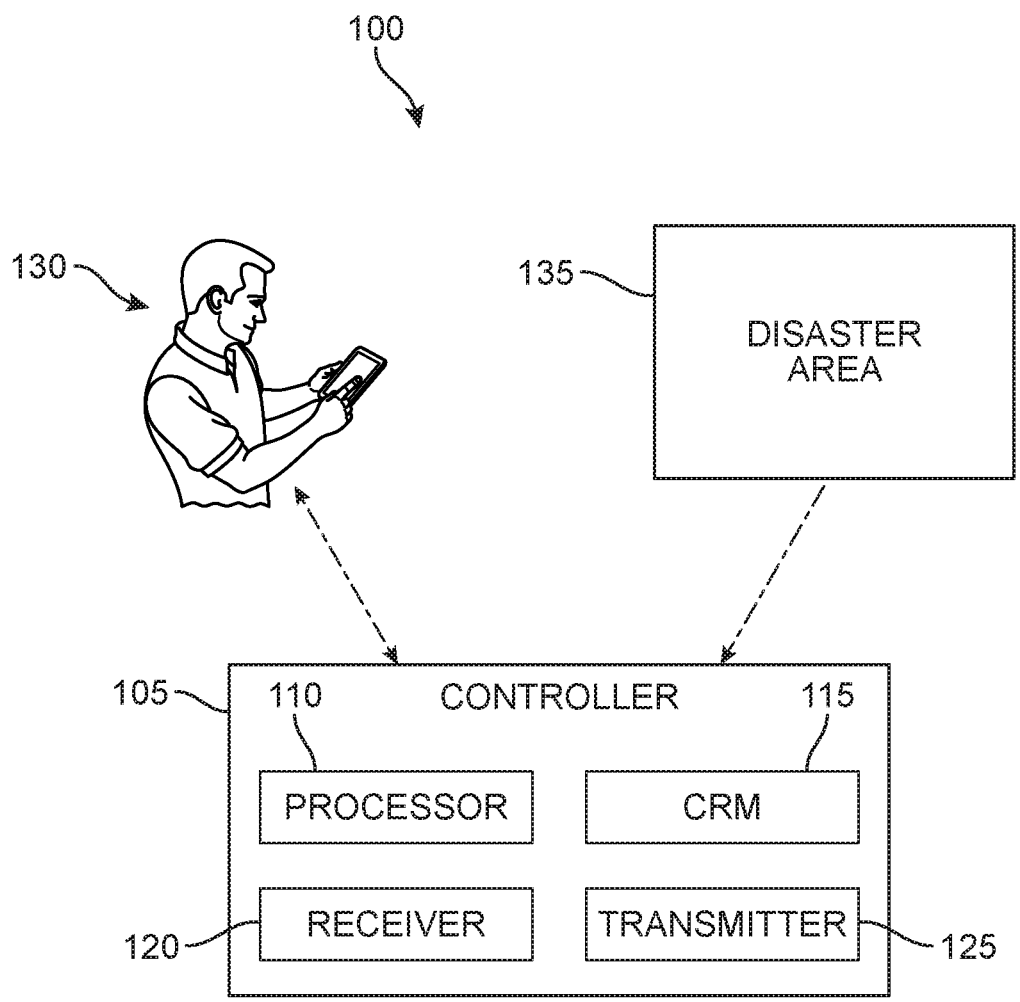
FIG. 1 is a schematic illustration of a disaster response management system.

FIG. 1 is a schematic illustration of a disaster response management system. FIG. 1 shows a disaster response management system 100, As shown in FIG. 1, system 100 may include a controller 105. Controller 105 may include various computing and communications hardware, such as servers, integrated circuits, displays, etc. Further, controller 105 may include a device processor 110 and a non-transitory computer readable medium 115 including instructions executable by device processor 110 to perform the processes discussed herein. The components of controller 105 may be implemented in association with a mobile conditions monitoring center, such as vehicle, or in association with a control center or conditions monitoring center located in a permanent building (i.e., brick and mortar establishment).

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 105 may include networking hardware configured to interface with other nodes of a network, such as a LAN, WLAN, or other networks. In Further, controller 105 may be configured to receive data from a plurality of sources and communicate information to one or more external destinations. Accordingly, controller 105 may include a receiver 120 and a transmitter 125, (It will be appreciated that, in some embodiments, the receiver and transmitter may be combined in a transceiver.) In some cases, communications between components may be made via the Internet, a cellular network, or other suitable communications network.

Any suitable communication platforms and/or protocols may be utilized for communication between controller 105 and other components of the system. Since the various sources of information may each have their own platform and/or protocol, system 100 may be configured to interface with each platform and/or protocol to receive the data.

In some embodiments, the computer readable medium may include instructions for receiving location data from a personal electronic device of a user 130. User 130 is shown holding a personal electronic device such as a smart phone. However, the personal electronic device from which location data is received may be any type of personal electronic device for which the location may be tracked. Exemplary alternatives include stationary devices, such as desktop computers; portable computing devices, such as tablets and laptops; and wearable technology, such as smart watches, fitness trackers, etc. These personal electronic devices may have similar components as controller 105. For example, the personal electronic devices may include a device processor and non-transitory computer readable medium containing instructions executable by the processor. Such devices may also include a receiver, transmitter, transceiver, or other communication equipment. Skilled artisans will readily recognize suitable features and specifications for such personal electronic devices for use with the disclosed system.

In addition, the computer readable medium may include instructions for receiving disaster data 135. Disaster data 135 may include any information relevant to a disaster. For example, disaster data 135 may include disaster forecast data, such as storm forecasts. In some cases, disaster data 135 may include disaster conditions data indicating the conditions in a disaster area. Such information may include the location of flooding, power outages, etc.

The computer readable medium may further include instructions for sending instructions for selectively displaying, based on the received location data, a list of one or more disaster response items which the user may commit to provide.

Thus, FIG. 1 illustrates the arrow showing communication between user 130 and controller 105 as a double-headed arrow, indicating two-way communication. Further, the computer readable medium may include instructions for receiving a selection of the user committing to provide one of the selectively displayed disaster response items.

The disaster response items may include any items that would be relevant to disaster response. In some embodiments, the disaster response items may include disaster response vehicles. Exemplary disaster response vehicles may include passenger vehicles, moving vehicles, boats, all-terrain vehicles, construction vehicles, drones (i.e., unmanned vehicles, be they for land, see, or air), or any other vehicles suitable for disaster response.

In some embodiments, the disaster response items may include disaster response equipment. Exemplary disaster response equipment may include electrical power generators, lighting equipment, power tools, hand tools, medical equipment, device charging equipment, or any other equipment suitable for disaster response.

In some embodiments, the disaster response items may include disaster response resources. Exemplary disaster response resources may include water, electrical power, fuel, food, shelter, and any other resource associated with disaster response efforts.

In some embodiments, the disaster response items may include disaster response supplies. Exemplary disaster response supplies may include first aid supplies, bedding supplies, medication, clothing, or any other supplies associated with disaster response efforts.

In some embodiments, the disaster response items may include disaster response services. Exemplary disaster response services may include distributing supplies, administering first aid, providing medical care, providing labor service, moving user's belongings, coordinating evacuation, reviewing post-disaster conditions imagery, assisting a nearby system user (or other nearby individual in need of assistance), or any other type of disaster response service.

Figure 2A:
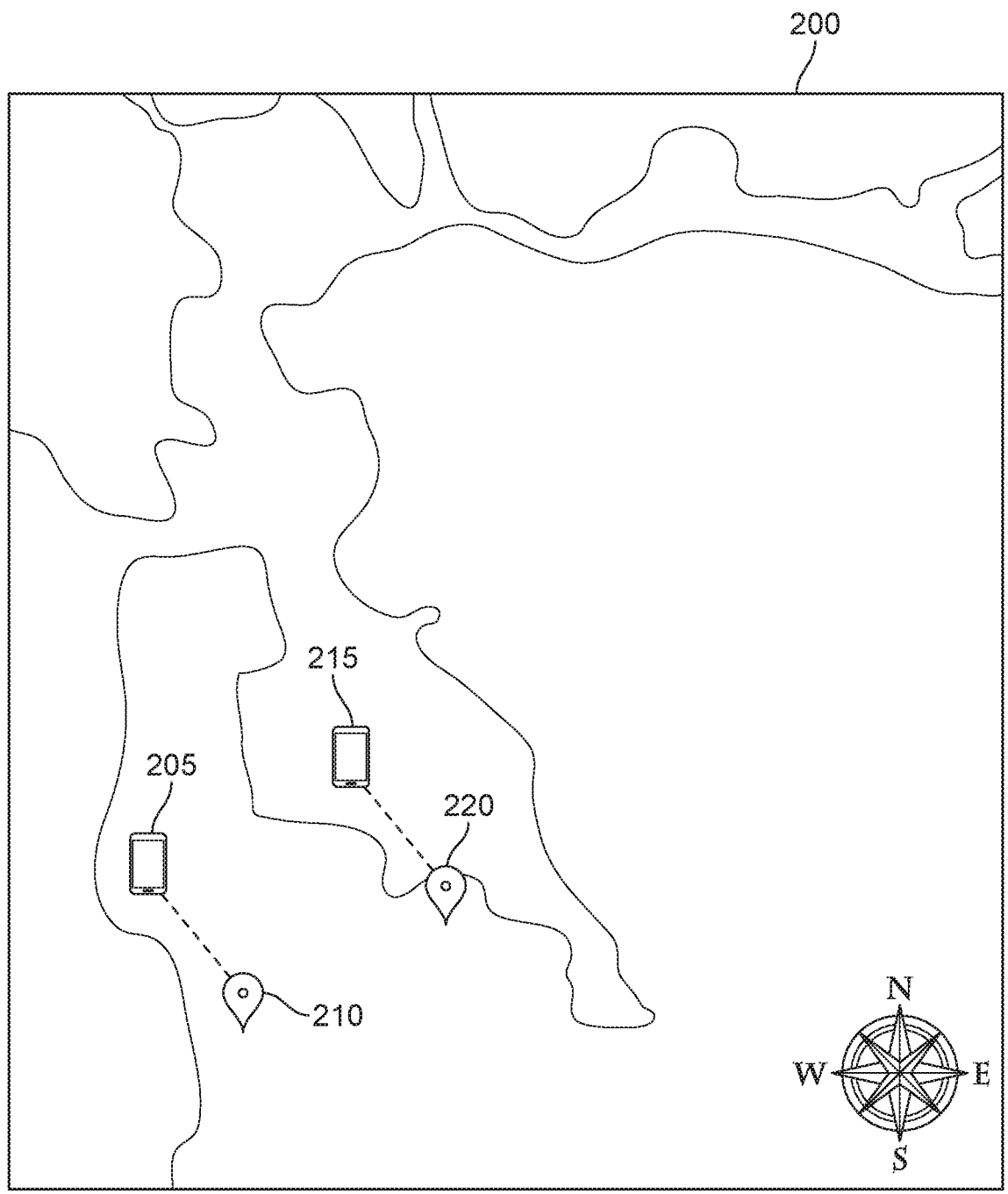
FIG. 2A is a schematic illustration of a map showing locations of two system users and their personal electronic devices.

FIG. 2A is a schematic illustration of a map showing locations of two system users and their personal electronic devices. As shown in FIG. 2A, a map 200 illustrates the locations of two system users located in proximity to one another. For example, a first user may have a first personal electronic device 205, which may be located at a first location 210. A second user may have a second personal electronic device, which may be located at a second location 220.

As discussed above, the location data from these two users may be received by the system. The information communicated to the user may be determined based on the location data received from their respective devices. For example, based on the location data received from their personal electronic device, each user, when accessing the system web page or application, may be shown a list of disaster response items for which they may volunteer in their geographic area. In some cases, the list disaster response items for which users may volunteer may include services associated with other users or other persons located nearby. For example, if the first user associated with first device 205 in FIG. 2A indicates in the system that they are available to provide evacuation assistance (e.g., moving persons' belongings), the system may list, as an available item, assisting the second user associated with second device 215. Similarly, if the second user is a person whose property has been flooded, the first user may commit to providing assistance to the second user in moving their belongings before the flood waters get too high.

Figure 2B:
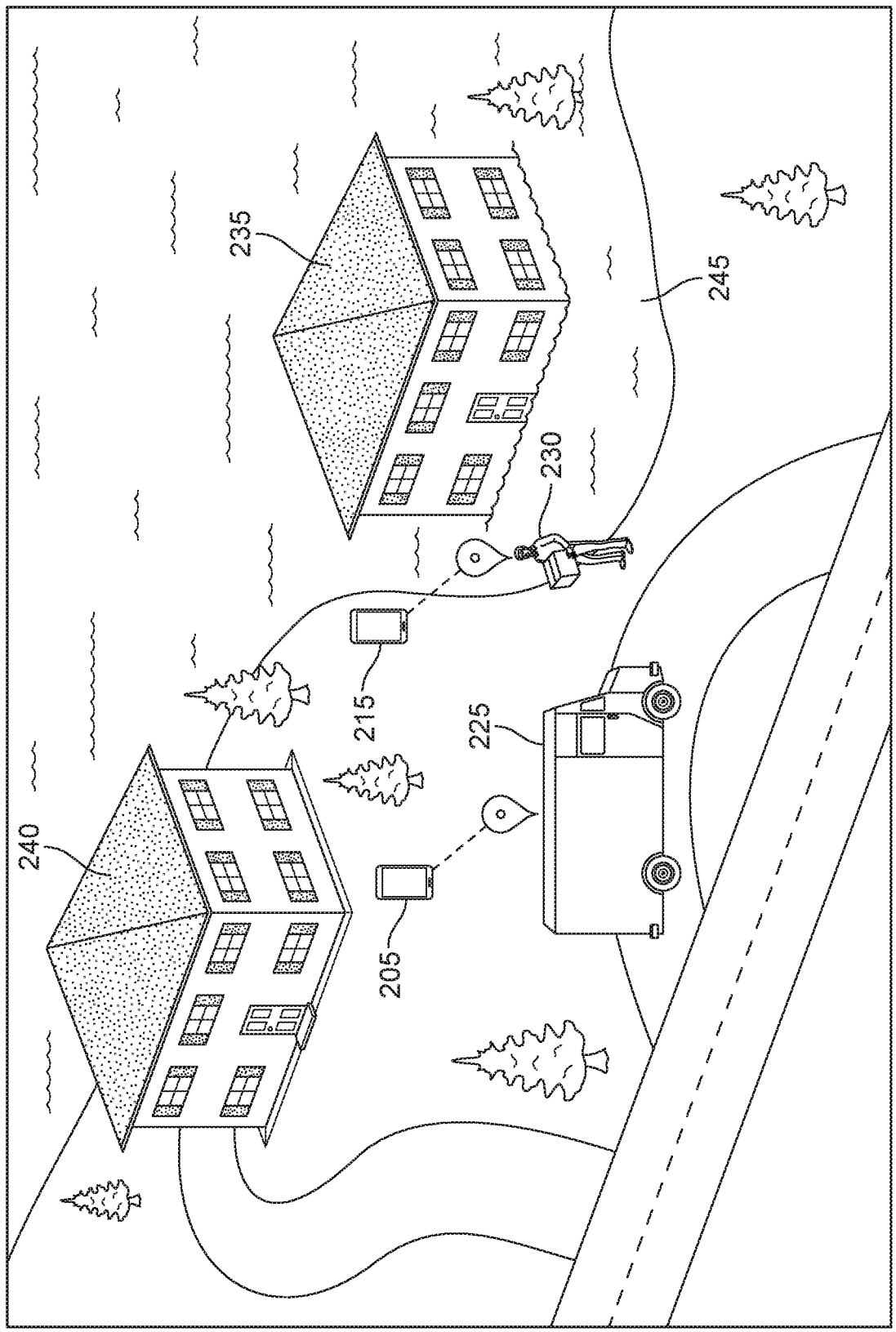
FIG. 2B is a schematic illustration of a first system user assisting a second system user.

FIG. 2B is a schematic illustration of the scenario described above. As shown in FIG. 2B, the first user and their first device 205 may drive a moving vehicle 225 to assist the second user 230, whose phone is device 215. As shown, second user 230 may be a resident in a home 235 that is flooded, as indicated by flood water 245. Because of the specificity of the data received by the system and the coordination of volunteer efforts to specific users, assistance may be provided specifically for the resident of home 235 and not home 240 next door, since home 240 is not flooded.

It will be understood that the disaster response items discussed above are exemplary only, and there may be a wide variety of items that volunteers may commit to provide as part of disaster response efforts. It will also be understood that, although these items are referred to as disaster "response" items, such "responses" may be executed prior to an impending disaster, for example in "response" to a forecasted disaster (e.g. a storm, such as a hurricane).

Users may interact with the system via an Internet web page or an application (app) on a personal electronic device, such as a mobile phone, as discussed above, FIG. 3 is a schematic illustration of a system interface for interacting with the disaster response management system of FIG. 1, FIG. 3 shows a personal electronic device 300 having a graphical user interface 305. Device 300 may be configured to display various menus of an app for users to interact with the system. As shown in FIG. 310, the app may display a menu 310 of requested items, which include disaster response items that are requested from volunteers. Users may select posted items from menu 310 and select "ENTER" (315) to submit their selection to the system.

Figure 3:
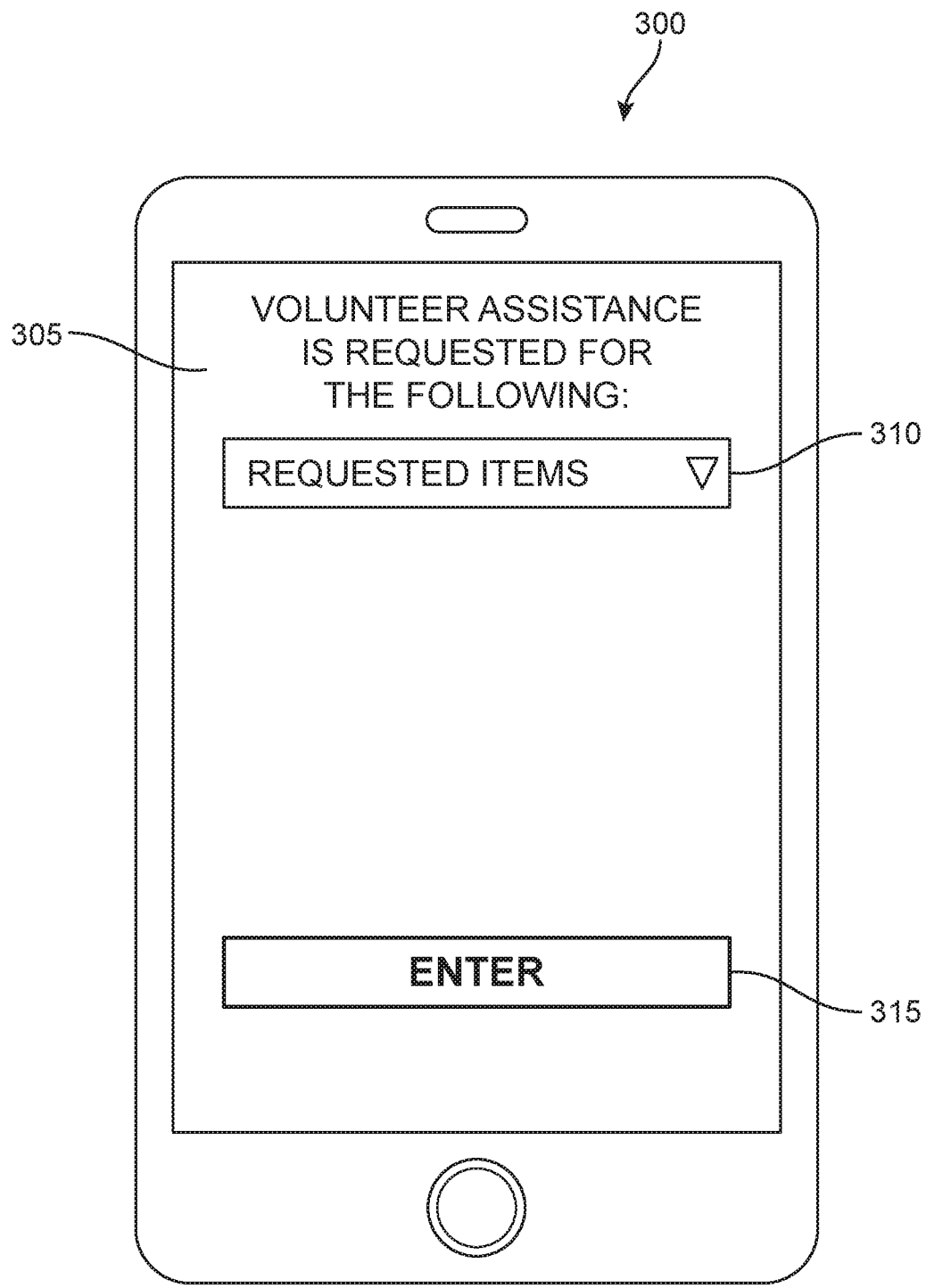
FIG. 3 is a schematic illustration of a system interface for interacting with the disaster response management system of FIG. 1.
Figure 4:
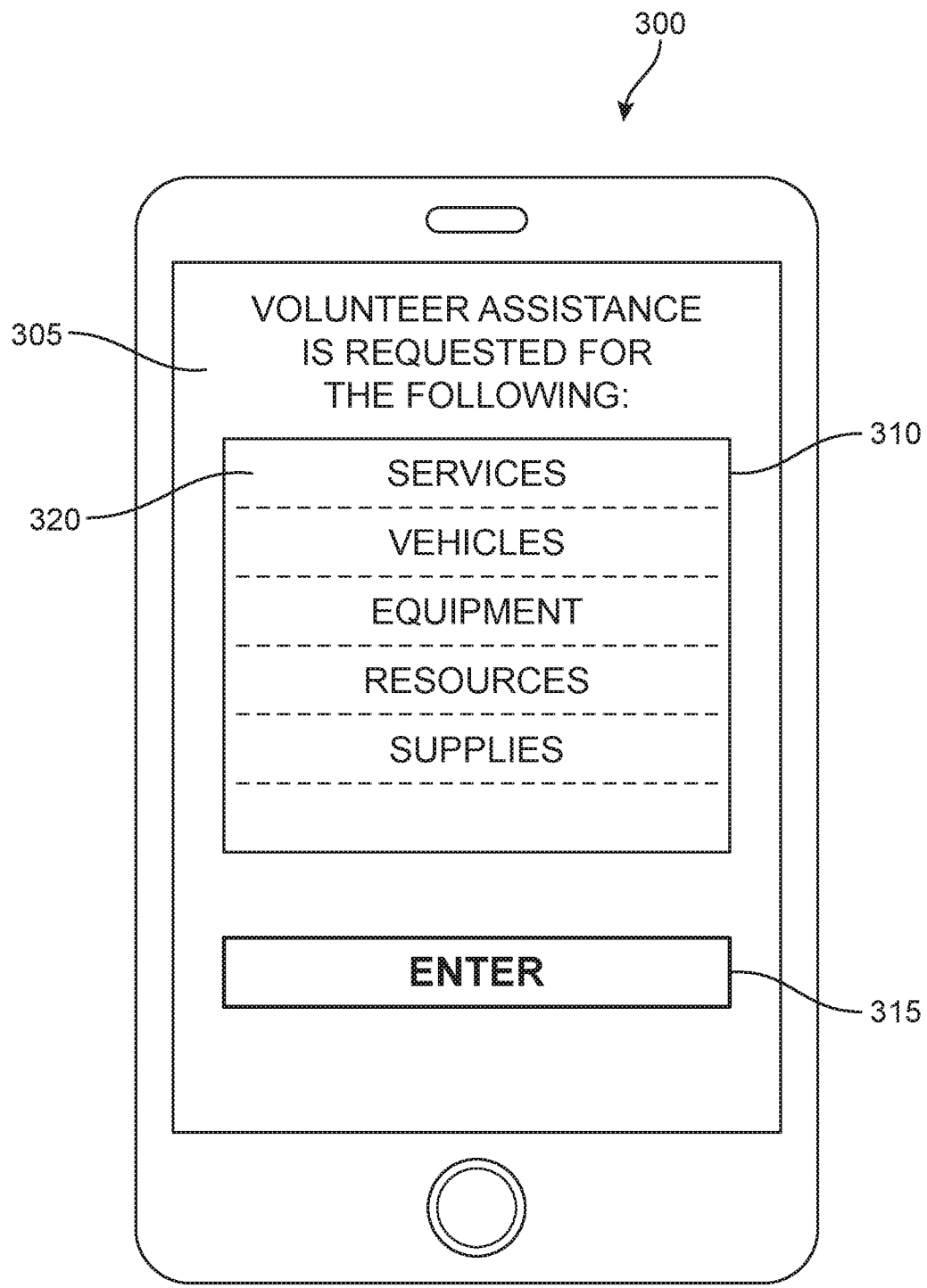
FIG. 4 is a schematic illustration showing menus of the interface shown in FIG. 3.

FIG. 4 is a schematic illustration showing menus of the interface shown in FIG. 3. As shown in FIG. 4, menu 310 may be a drop-down menu that, when selected, drops down to reveal a plurality of types of disaster response items from which the user may choose. Upon selecting a sub-category menu, like "SERVICES" 320, a sub-menu may reveal further choices. In some cases, all disaster response services from which the user may choose may be displayed. In some cases, sub-categories of disaster response services may be displayed, such as distributing supplies, administering first aid, providing medical care, providing labor service, moving user's belongings, coordinating evacuation, reviewing post-disaster conditions imagery, assisting a nearby system user. After selecting one of these sub-categories, all available disaster response items in the selected sub-category may be displayed. For example, if a user selects assisting nearby system user, the system may display a list of several users in need of assistance. For instance, the list may include a disabled user, a user in need of assistance moving their belongings, and a user who is in need of labor to help clean up their property after storm damage. Once a particular item is selected, additional information about the selection may be displayed, such as the location, distance from the user, urgency of the request, etc.

Figure 5:
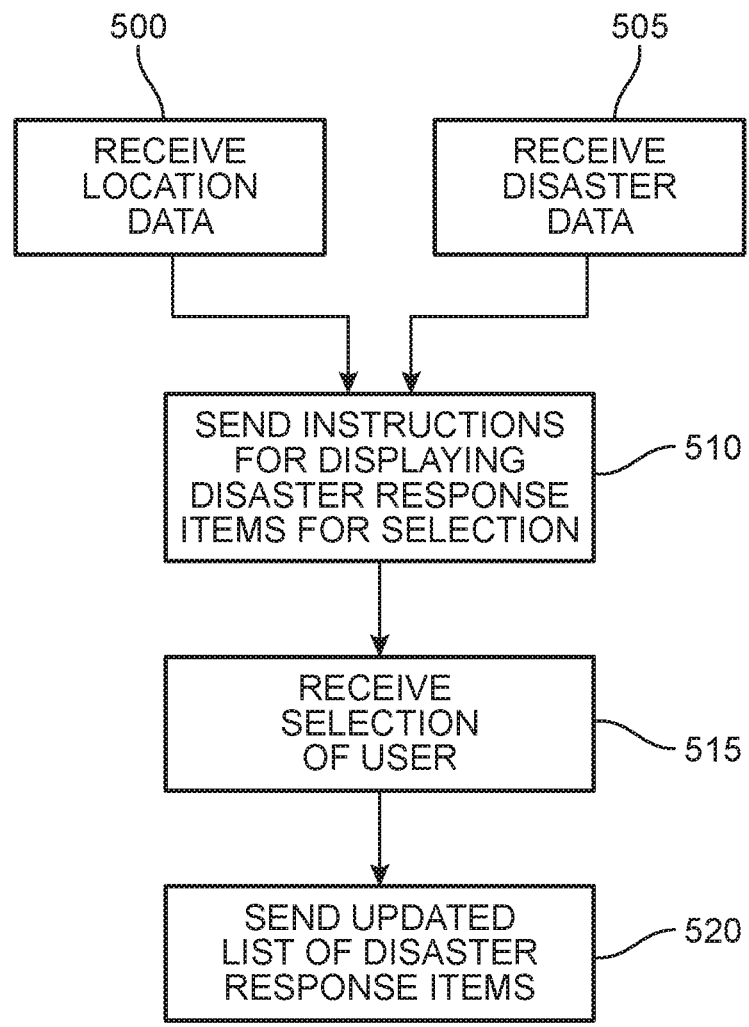
FIG. 5 is a flowchart illustrating a process of disaster response management.

FIG. 5 is a flowchart illustrating a process of disaster response management. As illustrated in FIG. 5, the computer readable medium may include instructions for receiving location data (step 500), with a system controller, from a personal electronic device of a user. In addition, the computer readable medium may include instructions for receiving disaster data (step 505), with the system controller, regarding a predicted disaster. Further, the computer readable medium may include instructions for sending instructions for displaying disaster response items for selection (step 510), based on the location data and the forecast data. Also, the computer readable medium may include instructions for receiving the selection of a user (step 515). In addition, the computer readable medium may include instructions for sending, to the user's personal electronic device, an updated list of disaster response items from which the user may choose (step 520).

In some embodiments, not only may the list of available disaster response items be generated based on the user's location and the disaster data, but also, the user may pre-designate the types of disaster response items that they are willing and able to contribute. For example, when the user registers with the system, they may indicate that they have a vehicle that they are willing to use to help persons move their belongings. Accordingly, among the disaster response items that populate as available for selection for that user may be jobs moving the belongings of particular persons nearby the user.

Figure 6:
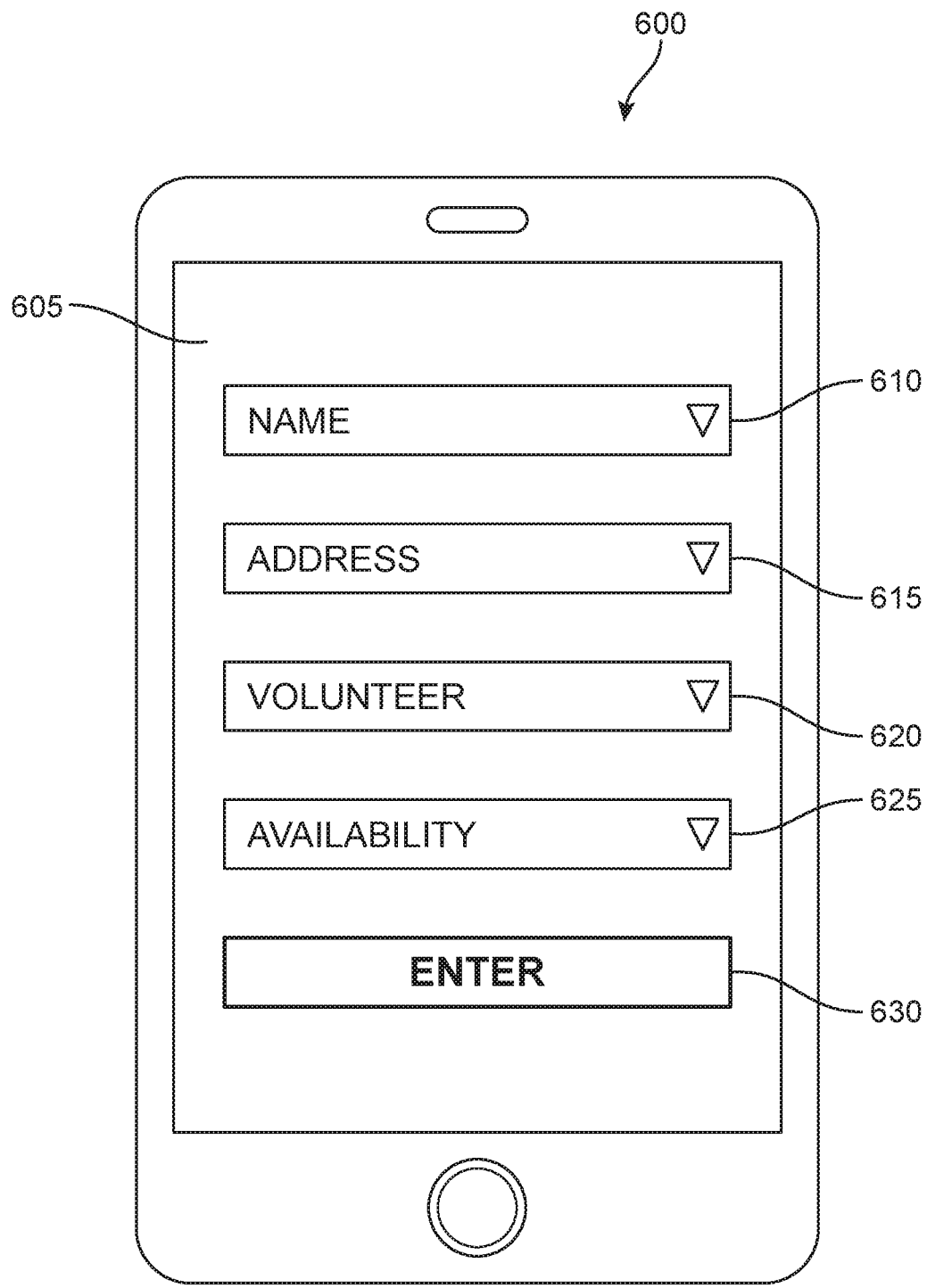
FIG. 6 schematic illustration of another system interface for interacting with a disaster response management system.

FIG. 6 schematic illustration of another system interface for interacting with a disaster response management system. FIG. 6 shows a personal electronic device 600 having a graphical user interface 605. Device 600 may be configured to display various menus of an app for users to interact with the system. Displayed on interface 605 are the menus of an application configured to enable a user to register with a disaster management system. Accordingly, device 600 may include a device processor and a non-transitory computer readable medium storing instructions that are executable by the device processor. The features and specifications of these components may be similar to the device processor and non-transitory computer readable medium discussed above.

Figure 7:
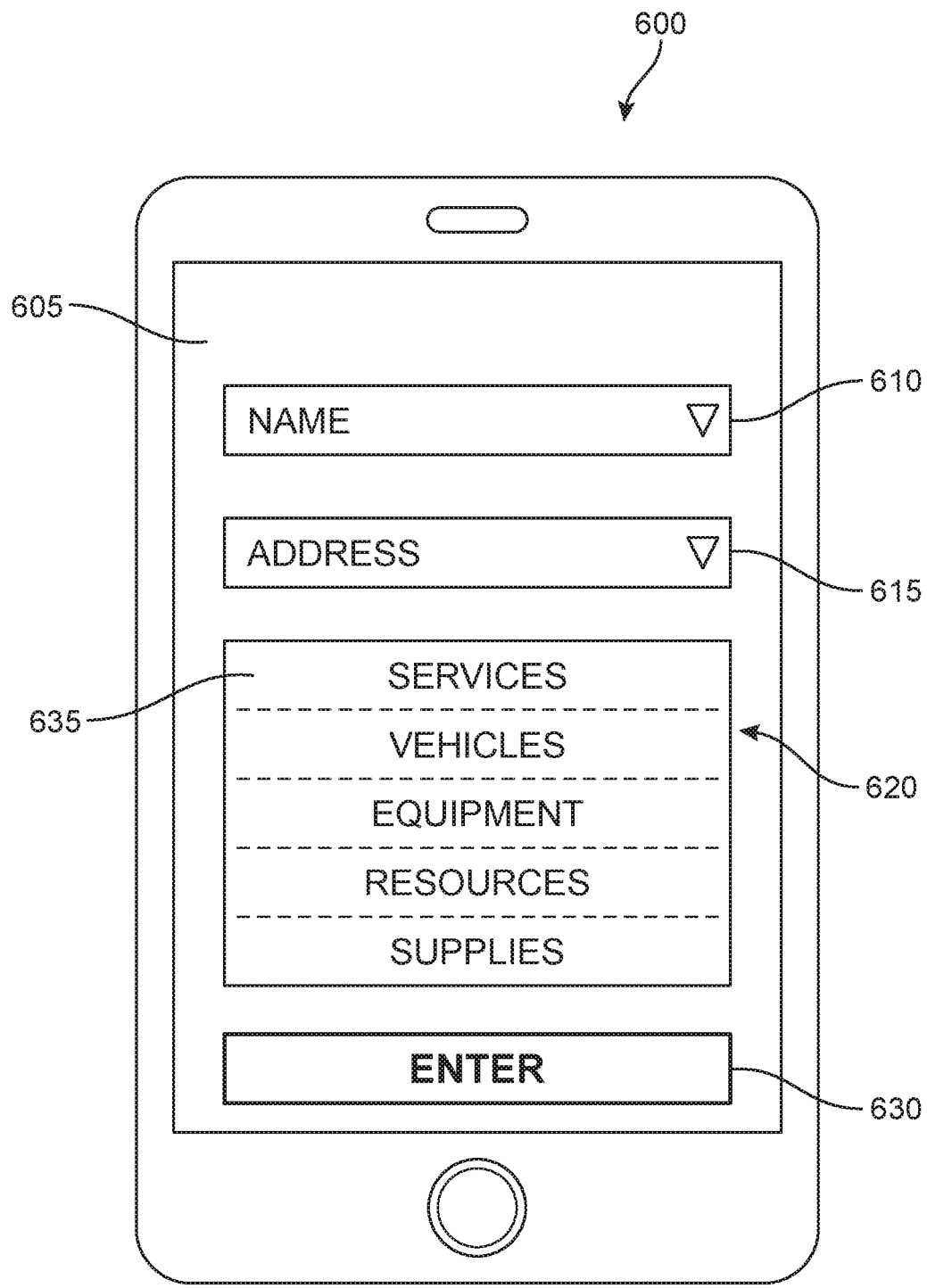
FIG. 7 is a schematic illustration showing menus of the interface shown in FIG. 6.

As shown in FIG. 6, a first field 610 may enable a user to enter their name. Also, a second field 615 may enable a user to enter their address information. In addition, at a menu 620, the user may indicate the type of items for which the user is willing to volunteer their commitment. The user may also indicate their availability using a menu 625. Once all relevant information has been provided, the user may finalize their registration, for example, by pressing an "ENTER" button 630. These and other types of information may be considered by the system in determining the disaster response items to be displayed to the user for selection, FIG. 7 is a schematic illustration showing menus of the interface shown in FIG. 6. As shown in FIG. 7, when entering the types of disaster response items that the user is willing and able to contribute, menu 620 may drop down to reveal a plurality of different categories of disaster response items. For example, a services sub-menu 635 may be selected. Within the services sub-menu, there may be further sub-menus, such as distributing supplies, administering first aid, providing medical care, providing labor service, moving user's belongings, coordinating evacuation, reviewing post-disaster conditions imagery, assisting a nearby system user, etc. Once one of these categories or sub-categories has been selected, and the registration finalized, the types of disaster response items that populate the user's account will reflect the types of items indicated during this registration process. The types of disaster response items may be designated by the user at any time after registration as well. For example, if a user no longer owns the moving vehicle, they may update their designated disaster response items that they are willing to contribute.

Figure 8:
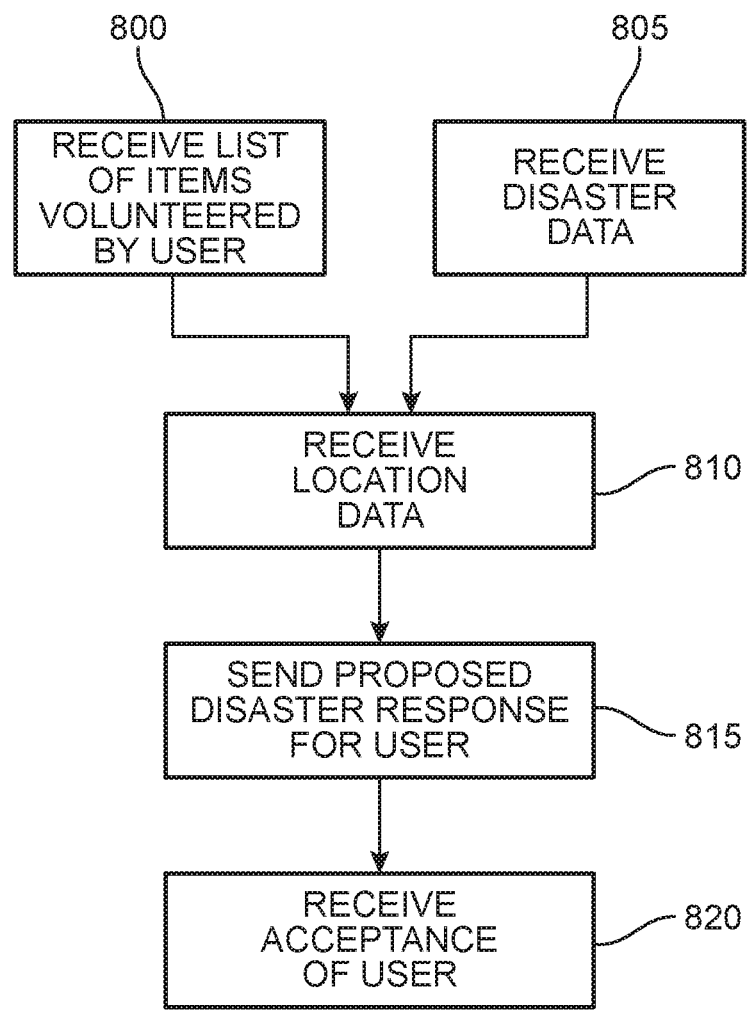
FIG. 8 is another flowchart illustrating a process of disaster response management.

FIG. 8 is another flowchart illustrating a process of disaster response management. As shown in FIG. 8, the computer readable medium may include instructions for receiving a list of items volunteered by the user (step 800), as described above with respect to FIGS. 6 and 7. In addition, the computer readable medium may include instructions for receiving disaster data (step 805). Also, the computer readable medium may include instructions for receiving location data from the personal electronic device of the user (step 810).

Once the information above has been received, proposed disaster response items may be proposed to the user based on this information. Accordingly, the computer readable medium may include instructions for sending proposed disaster response items for the user to select (step 815) and thereby commit to contributing. Further, the computer readable medium may include instructions for receiving an acceptance of the user, to finalize the arrangement. In some embodiments, at this point, the user may be given additional information in order to fulfill their commitment. For example, if the user commits to assisting a neighbor, the neighbor's address information may be provided to the user.

A system to those discussed above may also facilitate the coordination and aggregation of first responder efforts. For example, in some embodiments, a disaster response management system may be configured to receive a list of services that a first responder organization may be in need of. For example, for a fire department in proximity to a wild fire, it would be beneficial if the local fire department could post an announcement indicating their need for assistance to other fire departments and other first responders. The other fire departments and first responders could then select services that they commit to provide to assist the local fire department. The system may also be used to secure the assistance of first responders who may be simply visiting the area. In disaster situations, first responders often can use all the help they can get. Accordingly, any off duty first responders who may be vacationing, or otherwise visiting, an area that experiences a disaster, may be recruited and/or volunteer their services to aid with the disaster response effort.

Figure 9:
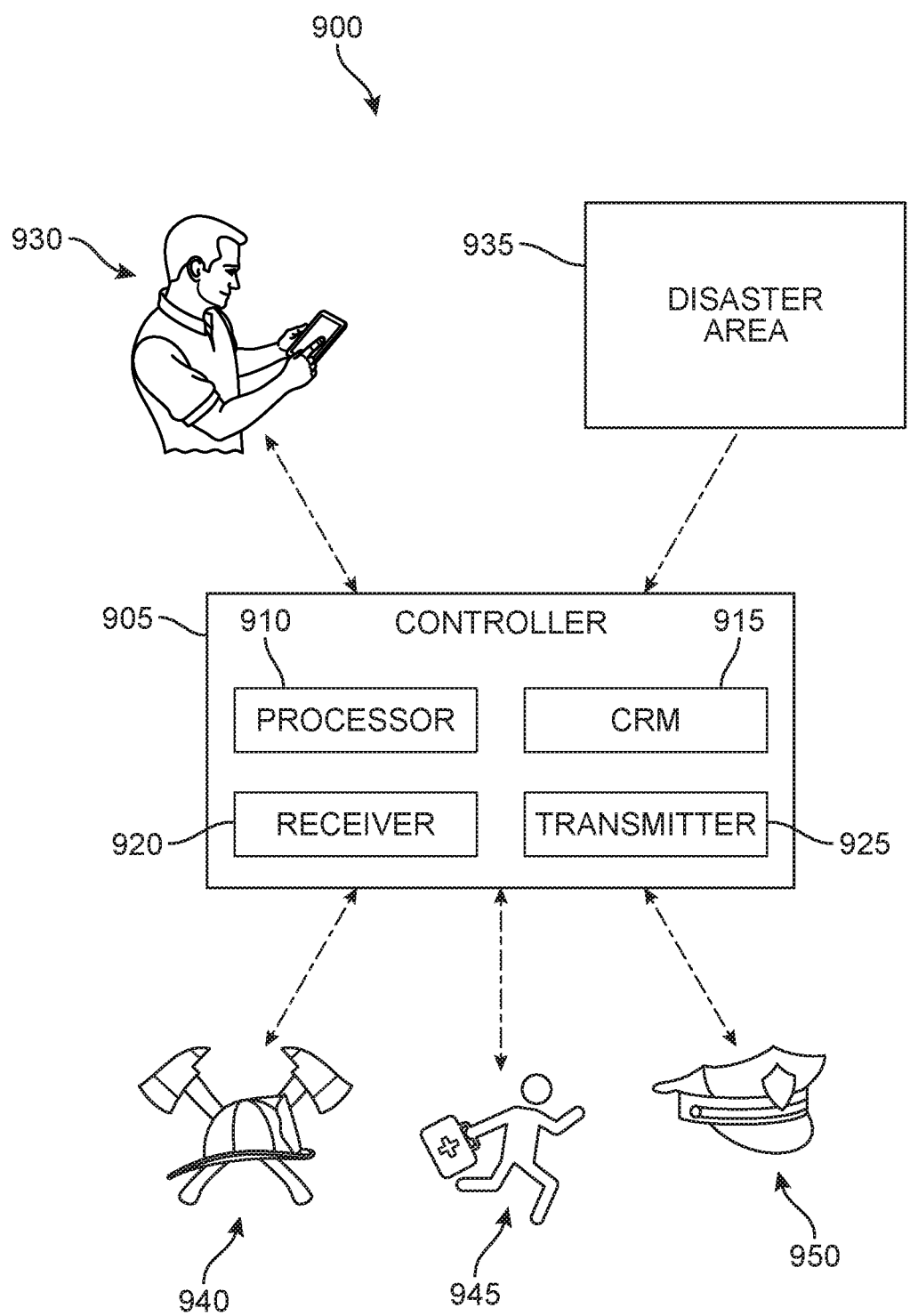
FIG. 9 is a schematic illustration of another disaster response management system.

FIG. 9 is a schematic illustration of another disaster response management system configured to coordinate first responder efforts. FIG. 9 shows a disaster response management system 900. As shown in FIG. 9, system 900 may include a controller 905. Controller 905 may include various computing and communications hardware, such as servers, integrated circuits, displays, etc. Further, controller 905 may include a device processor 910 and a non-transitory computer readable medium 915 including instructions executable by device processor 910 to perform the processes discussed herein. The components of controller 905 may be implemented in association with a mobile conditions monitoring center, such as vehicle, or in association with a control center or conditions monitoring center located in a permanent building (i.e., brick and mortar establishment).

Controller 105 may include networking hardware configured to interface with other nodes of a network, such as a LAN, WLAN, or other networks. In Further, controller 105 may be configured to receive data from a plurality of sources and communicate information to one or more external destinations. Accordingly, controller 105 may include a receiver 120 and a transmitter 125. (It will be appreciated that, in some embodiments, the receiver and transmitter may be combined in a transceiver.) In some cases, communications between components may be made via the Internet, a cellular network, or other suitable communications network. Controller 905 and its components may have the same or similar features as controller 105 and its components discussed above.

Also, similar to system 100 above, system 900 may be configured to receive location data regarding a personal electronic device of a user 930, as well as disaster data 935. In addition, system 900 may be configured to communicate with various first responders, such as firefighters 940, paramedics 945, and/or police 950. System 900 may be configured to communicate with any kind of first responders and first responder organizations. For example, system 900 may be configured to facilitate the coordination of efforts of any services that fall under the Department of Homeland Security's definition of "first responders." In particular, the term "first responder" is defined in U.S. Homeland Security Presidential Directive, HSPD-8 and reads: "The term 'first responder' refers to those individuals who in the early stages of an incident are responsible for the protection and preservation of life, property, evidence, and the environment, including emergency response providers as defined in section 2 of the Homeland Security Act of 2002 (6 U.S.C. § 101), as well as emergency management, public health, clinical care, public works, and other skilled support personnel (such as equipment operators) that provide immediate support services during prevention, response, and recovery operations." Further, "emergency response providers" are defined by 6 U.S.C. § 101 as follows: "(6) The term "emergency response providers" includes Federal, State, and local governmental and nongovernmental emergency public safety, fire, law enforcement, emergency response, emergency medical services providers (including hospital emergency facilities), and related personnel, agencies, and authorities."

Figure 10:
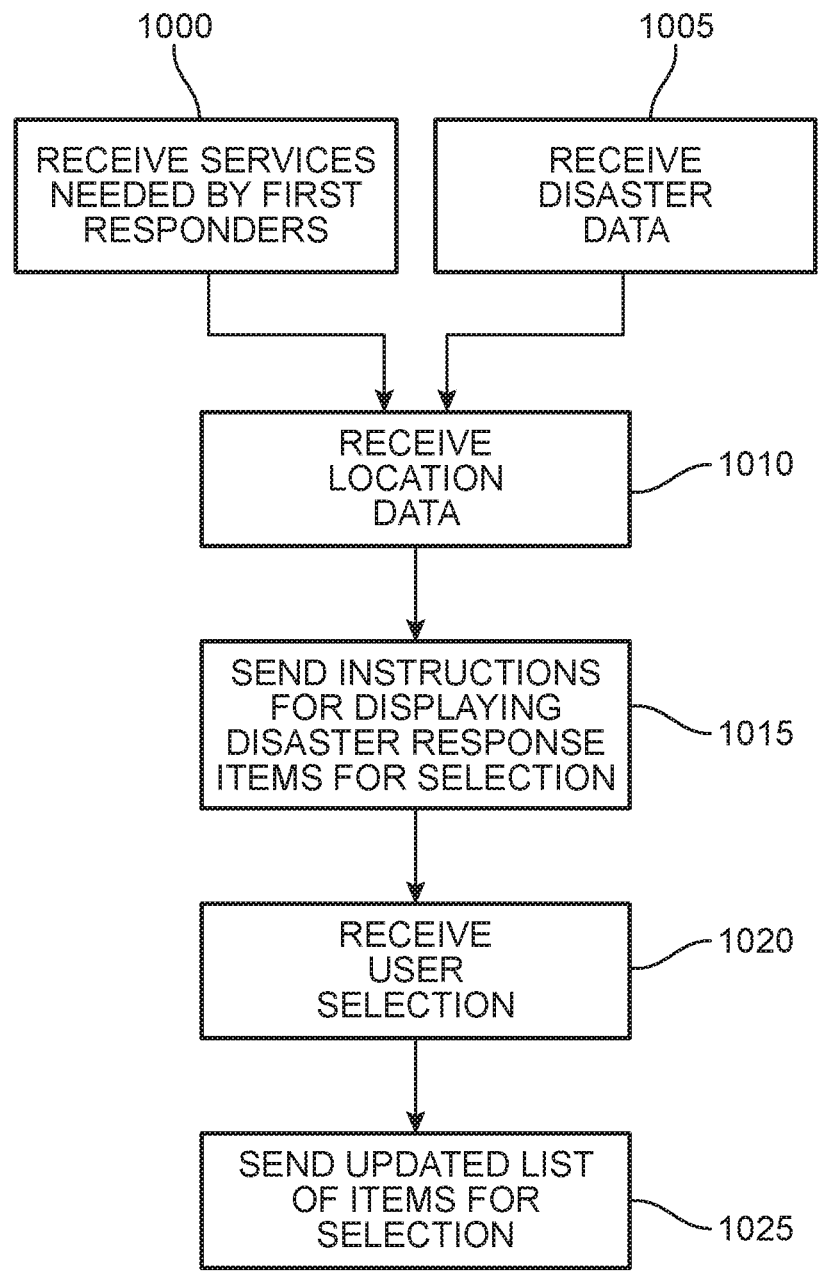
FIG. 10 is a flowchart illustrating another process of disaster response management.

FIG. 10 is a flowchart illustrating another process of disaster response management. As shown in FIG. 10, in some embodiments, the computer readable medium may include instructions, executable by the device processor, for receiving, from a first responder organization, a list of one or more disaster response services needed by the first responder organization (step 1000). In addition, the computer readable medium may include instructions for receiving location data from a personal electronic device of a user (step 1005). Further, the computer readable medium may include instructions for receiving an indication from a user that the user has training in first responder services.

In addition, the computer readable medium may include instructions for sending instructions for selectively displaying, based on the received location data, a list of one or more first responder services which the user may commit to provide (step 1015). Further, the computer readable medium may include instructions for receiving a selection of the user committing to provide one of the selectively displayed first responder services (step 1020). Also, the computer readable medium may include instructions for sending instructions for displaying an updated list of one or more services from which the user may choose (step 1025).

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A disaster response management system, comprising:
a device processor; and
a non-transitory computer readable medium including instructions executable by the device processor to perform the following steps:
receiving location data from a personal electronic device of a user;
sending instructions for selectively displaying, based on the received location data, a list of two or more disaster response items available for the user to commit to provide by selecting from the list;
receiving a selection of the user committing to provide one of the selectively displayed disaster response items; and
in response to the user's selection and independent of other user input, sending, to a personal electronic device of at least one other user, an updated list of disaster response items available for the at least one other user to commit to provide by selecting from the updated list;
wherein the updated list omits at least one item selected by the user; and
wherein the sending of the updated list occurs in close time proximity to the user's selection.

2. The system of claim 1, wherein the one or more disaster response items are selected from the group including:
disaster response services;
disaster response vehicles;
disaster response equipment;
disaster response resources; and
disaster response supplies.

3. The system of claim 2, wherein the disaster response services are selected from the group including:
distributing supplies;
administering first aid;
providing medical care;
providing labor service;
moving a user's belongings;
coordinating evacuation;
reviewing post-disaster conditions imagery; and
assisting a nearby user of the system.

4. The system of claim 2, wherein the disaster response vehicles are selected from the group including:
passenger vehicles;
moving vehicles;
boats;
all-terrain vehicles;
construction vehicles; and
drones.

5. The system of claim 2, wherein the disaster response equipment is selected from the group including:
electrical power generators;
lighting equipment;
power tools;
hand tools;
medical equipment; and
device charging equipment.

6. The system of claim 2, wherein the disaster response resources are selected from the group including:
water;
electrical power;
fuel;
food; and
shelter.

7. The system of claim 2, wherein the disaster response supplies are selected from the group including:
   first aid supplies;
   bedding supplies;
   medication; and
   clothing.

8. A disaster response management system, comprising:
   a device processor; and
   a non-transitory computer readable medium including instructions executable by the device processor to perform the following steps:
   receiving, from a first responder organization, a list of one or more disaster response services needed by the first responder organization;
   receiving location data from a personal electronic device of a user;
   receiving an indication from a user that the user has training in first responder services;
   sending instructions for selectively displaying, based on the received location data, a list of two or more first responder services available for the user to commit to provide by selecting from the list;
   receiving a selection of the user committing to provide one of the selectively displayed first responder services; and
   in response to the user's selection and independent of other user input, sending, to a personal electronic device of at least one other user, instructions for displaying an updated list of one or more services available for the at least one other user to commit to provide by selecting from the updated list;
   wherein the updated list omits at least one item selected by the user; and
   wherein the sending of the updated list occurs in close time proximity to the user's selection.

9. The system of claim 8, wherein the one or more first responder services are selected from the group including:
   paramedic services
   firefighting services; and
   police services.

10. A disaster response management method, comprising:
    performing the following steps by executing instructions stored on a non-transitory computer readable medium with a device processor:
    sending, to the personal electronic device of the user, instructions for selectively displaying, based on the received location data, a list of two or more disaster response items available for the user to commit to provide by selecting from the list;
    receiving a selection of the user committing to provide one of the selectively displayed disaster response items; and
    in response to the user's selection and independent of other user input, sending, to the a personal electronic device of at least one other user, an updated list of disaster response items available for the at least one other user to commit to provide by selecting from the updated list;
    wherein the updated list omits at least one item selected by the user; and
    wherein the sending of the updated list occurs in close time proximity to the user's selection.

11. The method of claim 10, further including receiving, from a user, a list of one or more volunteered disaster response items indicated as being available from the user; receiving location data from a personal electronic device of a user.

12. The method of claim 10, wherein the one or more disaster response items are selected from the group including:
    disaster response services;
    disaster response vehicles;
    disaster response equipment;
    disaster response resources; and
    disaster response supplies.

13. The method of claim 12, wherein the disaster response services are selected from the group including:
    distributing supplies;
    administering first aid;
    providing medical care;
    providing labor service;
    moving a user's belongings;
    coordinating evacuation;
    reviewing post-disaster conditions imagery; and
    assisting a nearby user of a system including the controller.

14. The method of claim 12, wherein the disaster response vehicles are selected from the group including:
    passenger vehicles;
    moving vehicles;
    boats;
    all-terrain vehicles;
    construction vehicles; and
    drones.

15. The method of claim 12, wherein the disaster response equipment is selected from the group including:
    electrical power generators;
    lighting equipment;
    power tools;
    hand tools;
    medical equipment; and
    device charging equipment.

16. The method of claim 12, wherein the disaster response resources are selected from the group including:
    water;
    electrical power;
    fuel;
    food; and
    shelter.

17. The method of claim 12, wherein the disaster response supplies are selected from the group including:
    first aid supplies;
    bedding supplies;
    medication; and
    clothing.

* * * * *